United States Patent [19]

dos Santos

[11] 4,189,104
[45] Feb. 19, 1980

[54] DEBONING MACHINE WITH BONE EXPELLER

[75] Inventor: Claudio dos Santos, Salt Lake City, Utah

[73] Assignee: Beehive Machinery, Inc., Sandy, Utah

[21] Appl. No.: 893,955

[22] Filed: Apr. 6, 1978

[51] Int. Cl.² .............................................. B02C 18/30
[52] U.S. Cl. ..................................... 241/82.3; 241/86
[58] Field of Search ................. 99/516; 425/202, 203, 425/207, 208; 241/74, 82.1, 82.2, 82.3, 260.1, 89.2, 247, 86; 17/1 G, 46

[56] References Cited

U.S. PATENT DOCUMENTS

| 3,739,994 | 6/1973 | McFarland | 241/74 |
| 4,042,176 | 8/1977 | Beck et al. | 241/74 X |

Primary Examiner—Mark Rosenbaum
Attorney, Agent, or Firm—Mallinckrodt & Mallinckrodt

[57] ABSTRACT

Deboning machines of the type in which an auger conveys ground meat and bone materials through a perforated conduit from one end thereof while exerting pressure on said materials to force meat components out of the conduit through the perforations thereof at the same time that bone components are being conveyed to discharge at the other end of the conduit through and adjustable valve ring which surrounds an extension of the auger and is adapted to control pressure within the conduit, are improved by constructing the valve ring with an internal, circumferential series of indentations confronting the auger extension and extending axially so as to be open to discharge for positively expelling bone components. Preferably, the indentations are of scallop formation and the confronting face of the auger extension passing through the valve ring is provided with a circumferential series of axially extending recesses that cooperate with the indentation of the valve ring in facilitating discharge of bone components. Also, preferably, the confronting faces of valve ring and auger extension are relatively steep and interface to establish a choke interrupted by the indentations of the valve ring and by the recesses of the auger extension except for a narrow band at the discharge end of the interface.

6 Claims, 4 Drawing Figures

DEBONING MACHINE WITH BONE EXPELLER

BACKGROUND OF THE INVENTION

1. Field

The invention is in the field of deboning machines of the type in which an auger conveys ground meat and bone materials through a perforated conduit from one end thereof, while exerting pressure on the materials to force meat components out of the conduit through the perforations thereof as bone components are conveyed to discharge at the other end of the conduit through an adjustable valve ring which surrounds an extension of the auger and is adapted to control pressure within the conduit.

2. State of the Art

Deboning machines of the type concerned are illustrated and described in McFarland U.S. Pat. No. 3,739,994 of June 19, 1973, entitled "Apparatus for Producing De-Boned Meat Products", and in Beck et al. U.S. Pat. No. 4,042,176 of Aug. 16, 1977, entitled "Deboning Apparatus and Method".

Objectives

It was a primary object in the making of the present invention to minimize dwell time of the bone components in and near the ring valve of machines of the type concerned and so increase throughput. Other objects were to minimize torque load, so as to save power, to minimize temperature rise in the material passing through the machine, and to minimize wear and breakage.

SUMMARY OF THE INVENTION

For accomplishing the objectives of the invention, the valve ring surrounding the extension of the auger is indented internally to provide a circumferential series of indentations confronting the auger extension and extending axially so as to be open to discharge for positively expelling bone components. Preferably, the indentations are of scallop formation and the confronting face of the auger extension passing through the valve ring is provided with a circumferential series of axially extending recesses that cooperate with the indentations of the valve ring in facilitating discharge of bone components. Also, preferably, the confronting faces of valve ring and auger extension are relatively steep and interface to establish a choke interrupted by the indentations of the valve ring and by the recesses of the auger extension except for a narrow band at the discharge end of the interface.

THE DRAWINGS

In the illustrated embodiment, which represents the best mode presently contemplated for carrying out the invention in actual practice:

FIG. 1 is a fragmentary view in axial section through the deboning and discharge portion of a deboning machine incorporating the invention;

FIG. 2, a section taken along the line 2—2 of FIG. 1;

FIG. 3, a section taken along the line 3—3 of FIG. 1; and

FIG. 4, a pictorial view of the valve ring per se looking toward the material entry end thereof.

DETAILED DESCRIPTION OF THE ILLUSTRATED EMBODIMENT

Figure 1:
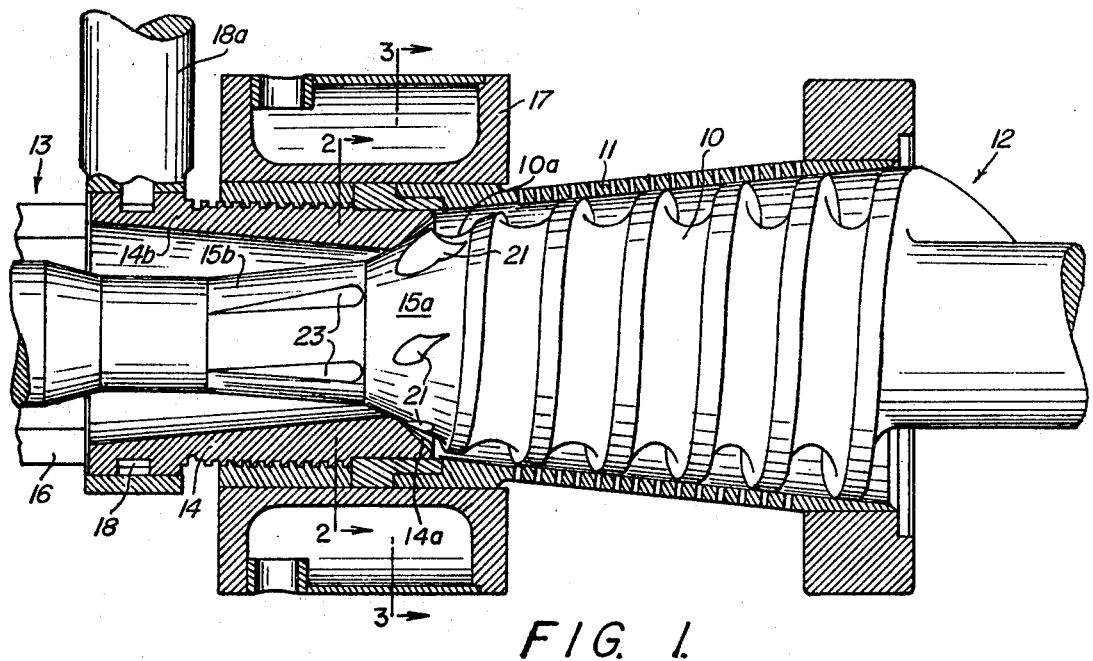
Figure 2:
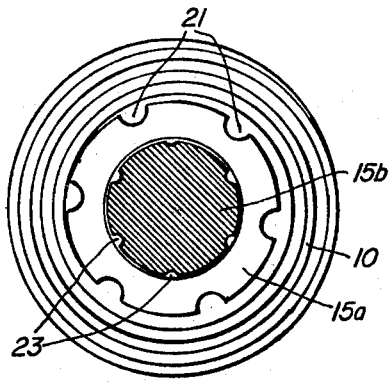
Figure 3:
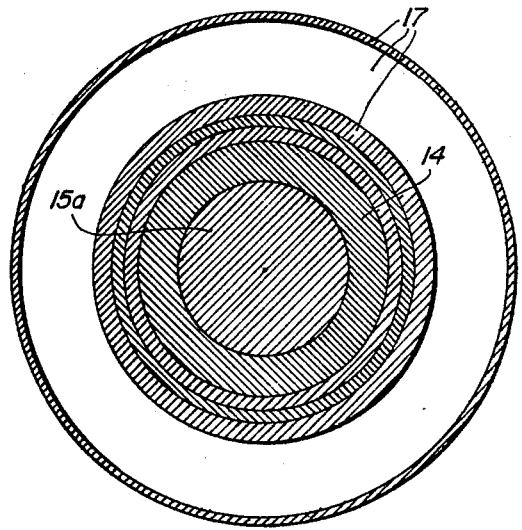

In the form illustrated, the deboning machine includes a compression type of conveyor screw or auger 10 operating in a perforated conduit 11 to convey a comminuted mixture of meat and bone from the feed end 12 of the machine to the bone discharge end 13 thereof. A valve ring 14 surrounds an extension 15 of auger 10 and is adjustable in position relative thereto to control the size of the annular discharge orifice formed between confronting faces 14a and 15a of valve ring and auger extension.

Auger extension 15 comprises a first portion (providing face 15a), which is steep relative to the auger axis, preferably an angle of thirty degrees thereto, and a second longer portion 15b that is considerably less steep, preferably an angle of eight degrees. Further portions, as is customary, carry the auger through a bone discharge cage 16 and to a supporting bearing (not shown) at the discharge end of the machine.

Valve ring 14 is elongate in usual manner, being threaded into a water-cooled valve housing 17 for back and forth adjustment by means of a ratchet 18 having an operating handle 18a. A first portion of valve ring 14 (providing face 14a) is steep relative to the auger axis, as is the first portion 15a of auger 15, and a second portion 14b is less steep and is divergent relative to the second portion 15b of auger 15. The confronting faces 14a and 15a of valve ring and auger, respectively, are adapted to interface and provide a choke for controlling pressure within perforated conduit 11, thereby controlling extrusion through the perforations of such conduit of the meat component of the comminuted meat and bone mixture fed to the machine. The bone component, having provided a filter mat for the meat component in the travel through the machine, is passed to discharge through the annular passage between the confronting faces 14a and 15a. Movement of valve ring 14 along the axis of auger 15 adjusts the spacing between such confronting faces from an interface position constituting full choke to any desired size of annular discharge opening. This configuration and the operation thereof are generally known.

Figure 4:
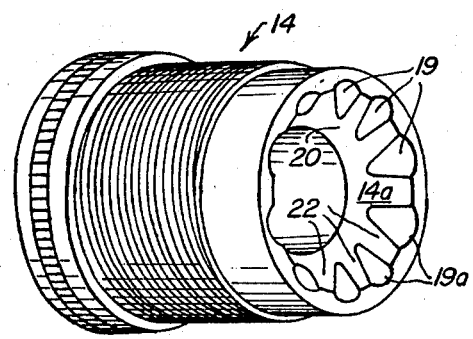

What isn't known are the features constituting the improvement of the present invention. In accordance with the invention, face 14a of valve ring 14 is provided with a circumferential series of indentations, preferably of scallop formation 19 as illustrated, FIG. 4, extending axially so as to facilitate material discharge through the valve ring. The scallop indentations 19 converge in width and decrease in depth from respective entry mouths 19a, FIG. 4, toward the discharge end of the valve ring. They preferably terminate at an unindented, interface band 20 of the face 14a at the discharge end of the auger-extension-confronting face 14a of valve ring 14, so as to establish a full choke position for the ring valve. However, there need not be such an unindented interface band, nor need there by any actual provision for interfacing of, i.e. substantially bringing into mutual engagement, the faces 14a and 15a.

A further preferred feature of the invention is the provision of a circumferential series of recesses, such as the recesses 21, in the face 15a of auger extension 15 for cooperation with the indentations 19 of valve ring 14. Such recesses open into the final screw valley 10a of auger 10, so as to facilitate discharge of bone components from the auger and passage thereof through valve ring 14.

As illustrated, recesses 21 are canted in the direction of auger rotation and, somewhat like the scallop indentations 19, become narrower and shallower in their extension toward the discharge end of the machine from relatively wide entry mouths in valley 10a. As illustrated, it is presently preferred that they too, like the scallop indentations 19, terminate at the band 20. In this embodiment, band 20 is three sixteenths of an inch in width. Also as illustrated, it is preferred to space scallop indentations from one another by interface portions 22 whose widths may vary as desired.

It may also be desirable in some instances to further facilitate discharge of bone material by providing the second auger extension portion 15b with a circumferential series of elongate recesses 23, which are preferably tapered toward the discharge end of the machine as shown.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. In a deboning machine of the type in which an auger conveys ground meat and bone material through a perforated conduit from one end thereof while exerting pressure on said materials to force meat components out of the conduit through the perforations thereof at the same time that bone components are being conveyed to discharge at the other end of the conduit through an adjustable valve ring with a face that surrounds and confronts an extension of the auger which includes a confronting face and is adapted to control pressure within the conduit, the improvement comprising an internal, circumferential series of indentations in said face of the valve ring, said indentations extending axially so as to facilitate material discharge through said valve ring.

2. The deboning machine improvement set forth in claim 1, wherein the auger-extension-confronting face of the valve ring is adapted to interface with the auger extension in a relatively narrow, unindented band at the discharge end of said face, and the indentations of said face of the valve ring terminate at said band.

3. The deboning machine improvement set forth in claim 1 wherein the indentations are of scalloped form in converging in width and decreasing in depth toward the discharge end of the valve ring from respective entry mouths thereof located at the feed end of said valve ring.

4. The deboning machine improvement set forth in claim 3, wherein the indented face of the valve ring and the confronting face of the auger extension are steep relative to the auger axis and interface along a relatively narrow band adjacent the discharge ends of said faces.

5. The deboning machine improvement set forth in either claim 1 or 4, wherein the confronting face of the auger extension is provided with a circumferential series of axially extending recesses in material-expelling relationship with the indentations of the valve ring face.

6. The deboning machine improvement set forth in either claim 1, 2, or 3, wherein the auger extension has a portion located downstream from the portion confronting the indented face of the valve ring that is provided with a series of elongate recesses extending axially of the auger.

* * * * *